US012735119B2

(12) United States Patent
Park et al.

(10) Patent No.: US 12,735,119 B2
(45) Date of Patent: Sep. 15, 2026

(54) REINFORCEMENT STRUCTURE OF DECK FOR VEHICLE

(71) Applicants: Hyundai Motor Company, Seoul (KR); Kia Corporation, Seoul (KR)

(72) Inventors: Jun Young Park, Gunpo-si (KR); Woo Been Byeon, Suwon-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 397 days.

(21) Appl. No.: 18/342,161

(22) Filed: Jun. 27, 2023

(65) Prior Publication Data

US 2024/0199142 A1 Jun. 20, 2024

(30) Foreign Application Priority Data

Dec. 20, 2022 (KR) ........................ 10-2022-0179335

(51) Int. Cl.
*B62D 33/023* (2006.01)

(52) U.S. Cl.
CPC .................................. *B62D 33/023* (2013.01)

(58) Field of Classification Search
CPC ............ B62D 25/2027; B62D 25/2054; B62D 33/02; B62D 33/023; B62D 33/0273; B62D 33/03; B62D 33/037
USPC ............................... 296/57.1, 187.11, 193.08
See application file for complete search history.

(56) References Cited

U.S. PATENT DOCUMENTS

| | | | | |
|---|---|---|---|---|
| 9,126,630 | B1 * | 9/2015 | Gallagher | B62D 27/023 |
| 10,259,509 | B2 * | 4/2019 | Marchlewski | B62D 33/023 |
| 10,343,727 | B1 * | 7/2019 | Hihara | B62D 33/023 |
| 2006/0108835 | A1 * | 5/2006 | McClure | B62D 25/04 296/193.06 |
| 2010/0072781 | A1 * | 3/2010 | Werner | B62D 33/02 296/184.1 |

FOREIGN PATENT DOCUMENTS

KR 19990017309 U 5/1999

* cited by examiner

*Primary Examiner* — Jason S Daniels
(74) *Attorney, Agent, or Firm* — Slater Matsil, LLP

(57) ABSTRACT

An embodiment structure for reinforcing a deck of a vehicle includes chassis frames positioned on both side surfaces of a lower end of the deck of the vehicle, a wheelhouse assembly positioned on the chassis frame and defining a side surface of the deck, and a reinforcement structure positioned at an end of the wheelhouse assembly at a position where a rear gate is positioned at a rear end of the deck.

20 Claims, 8 Drawing Sheets

[FIG. 1]
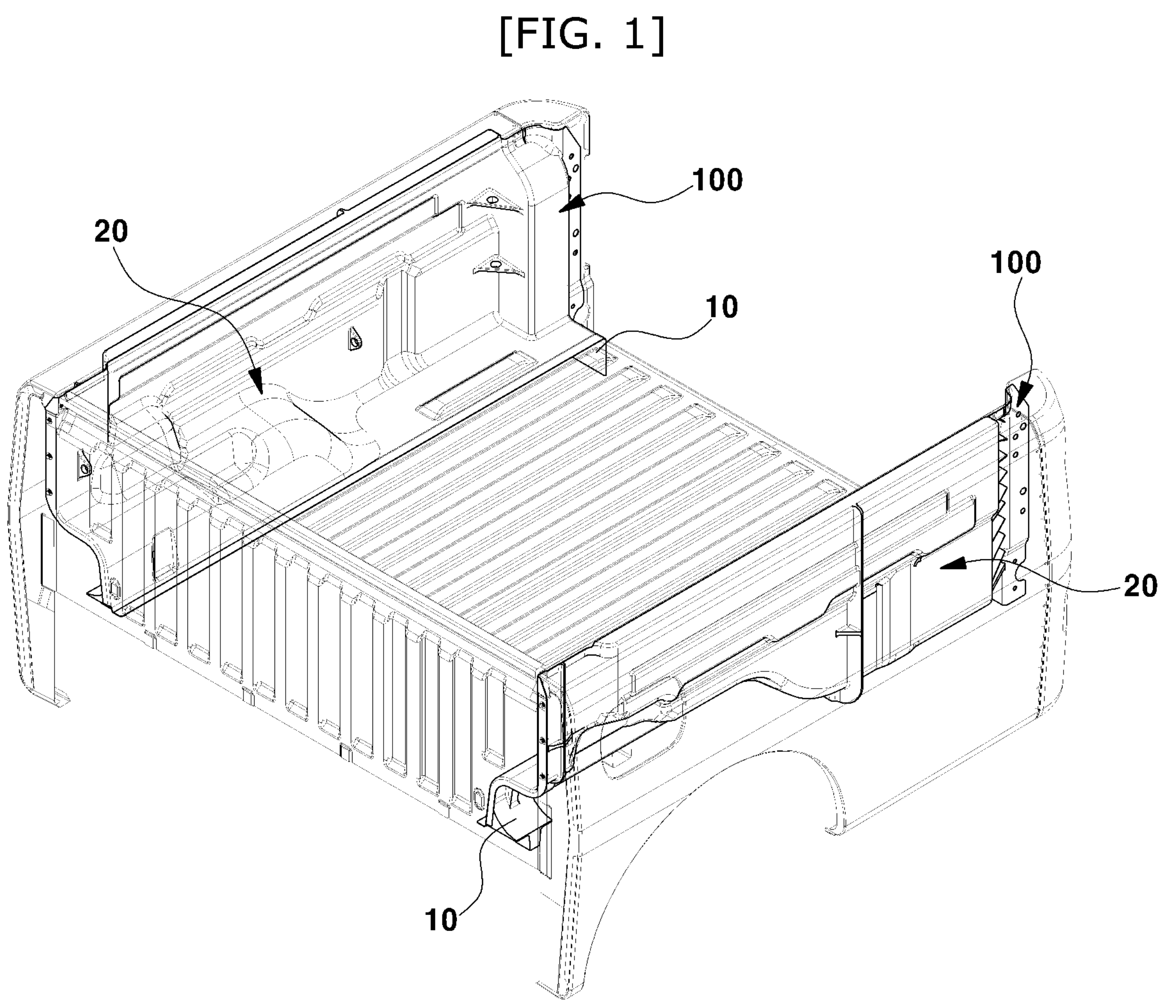

[FIG. 2]
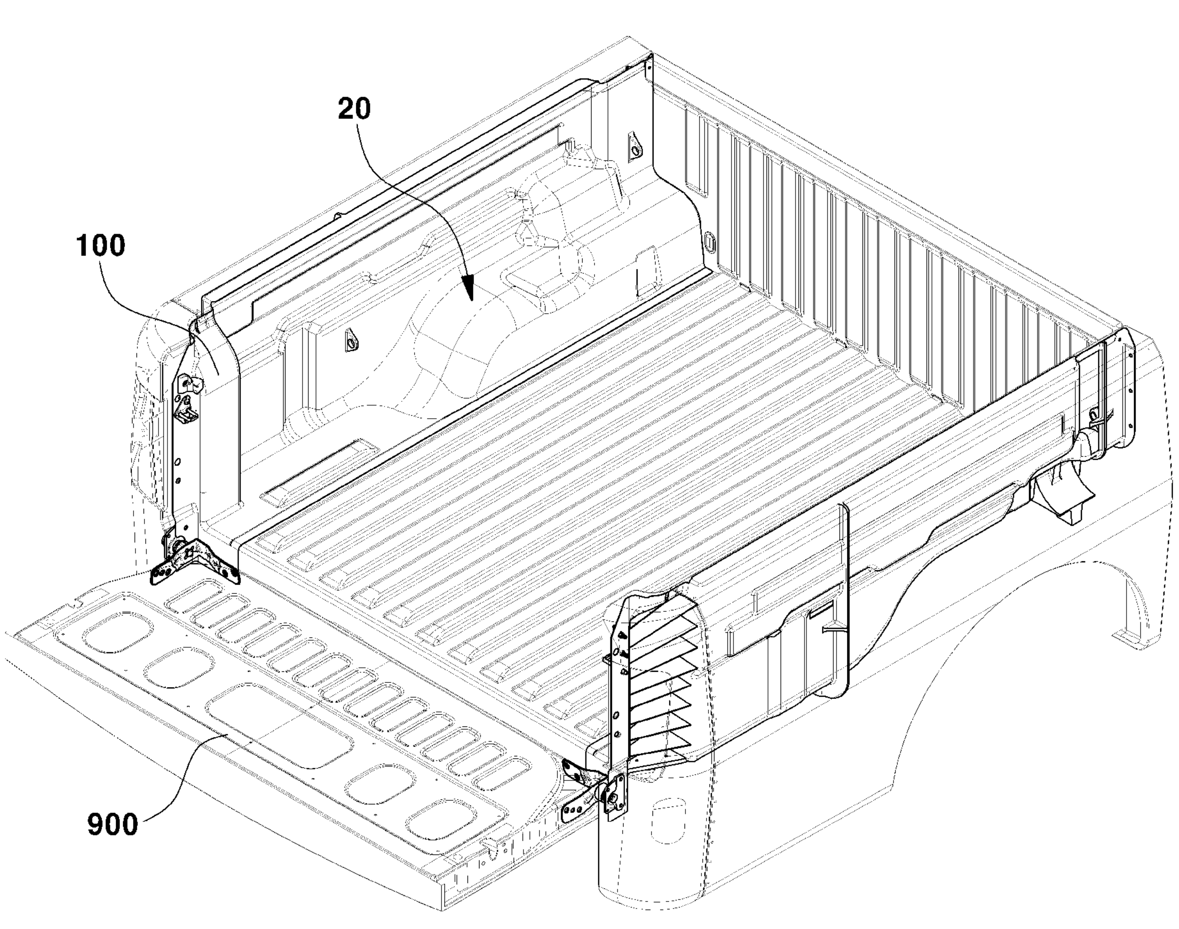

[FIG. 4]
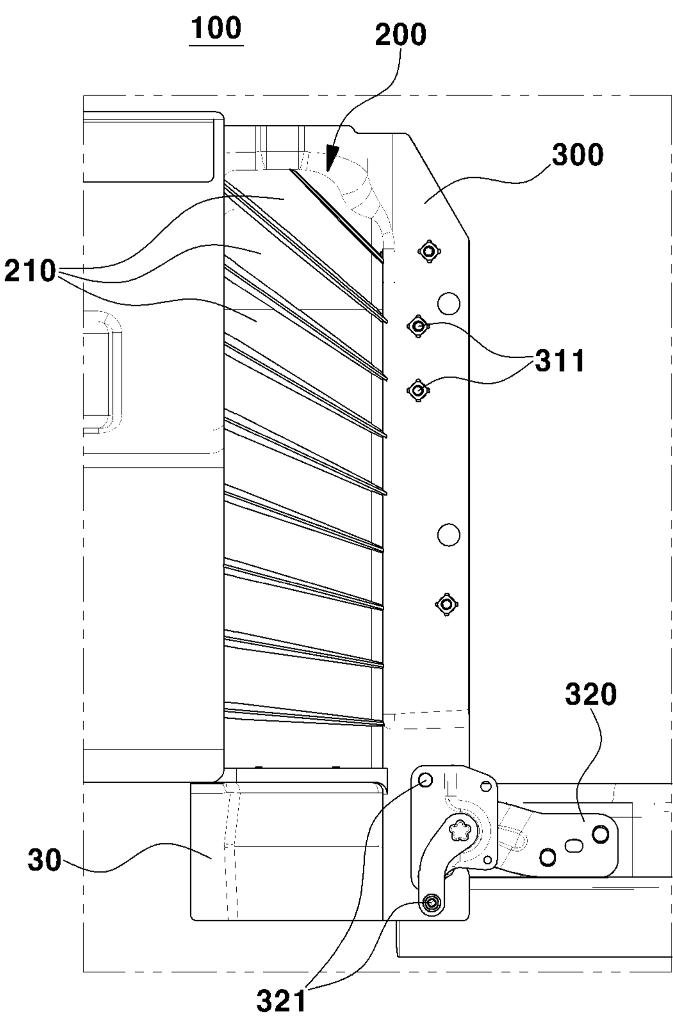

[FIG. 5]
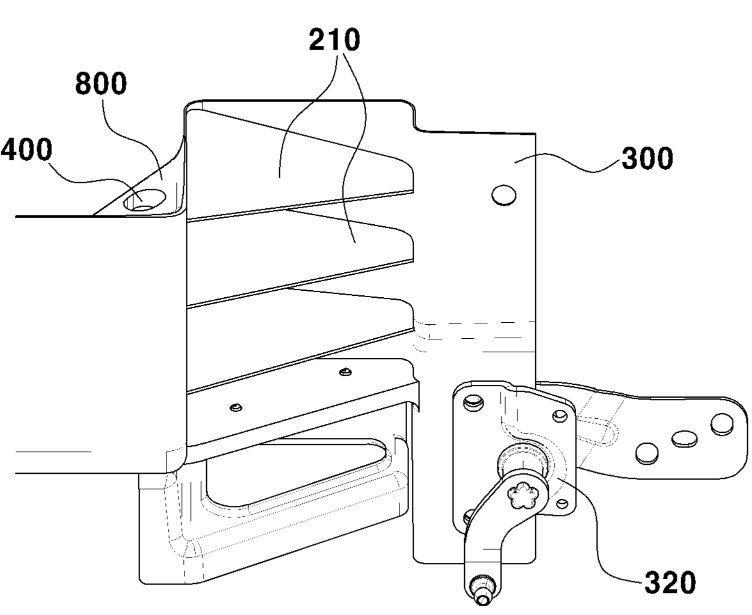

[FIG. 6]
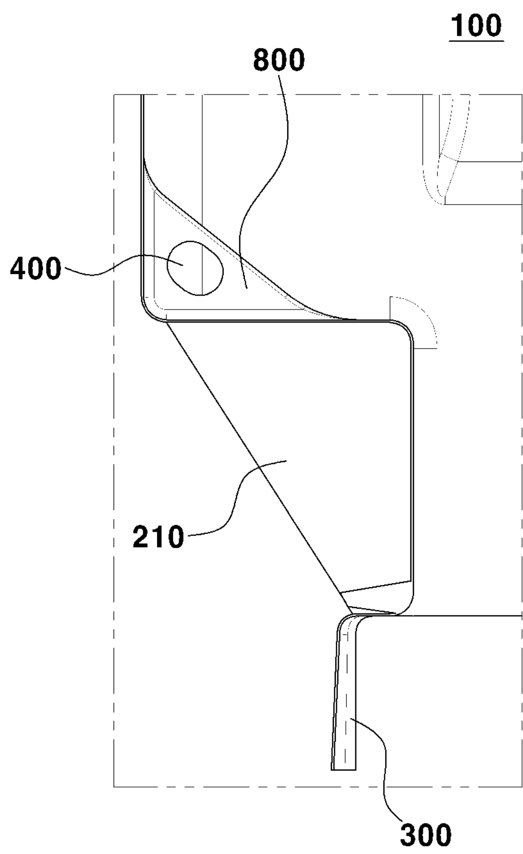

[FIG. 7]
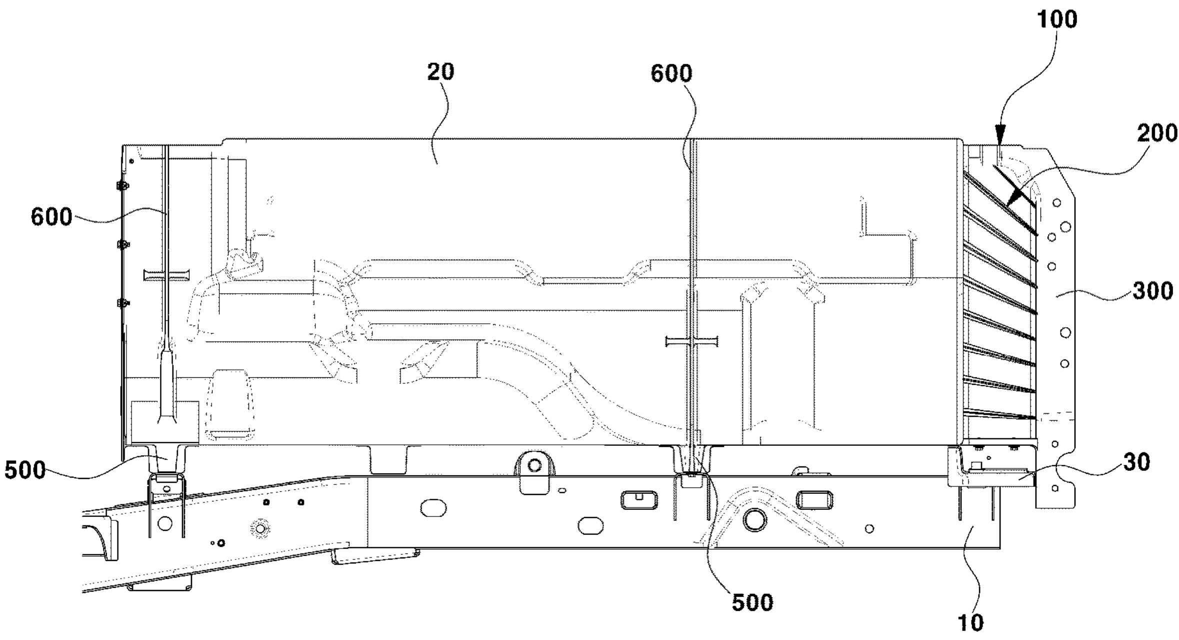
[FIG. 8]
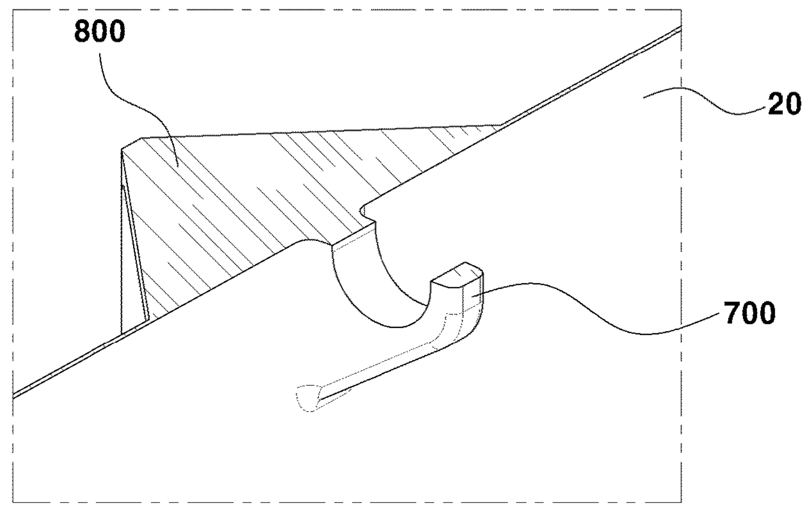

[FIG. 9]
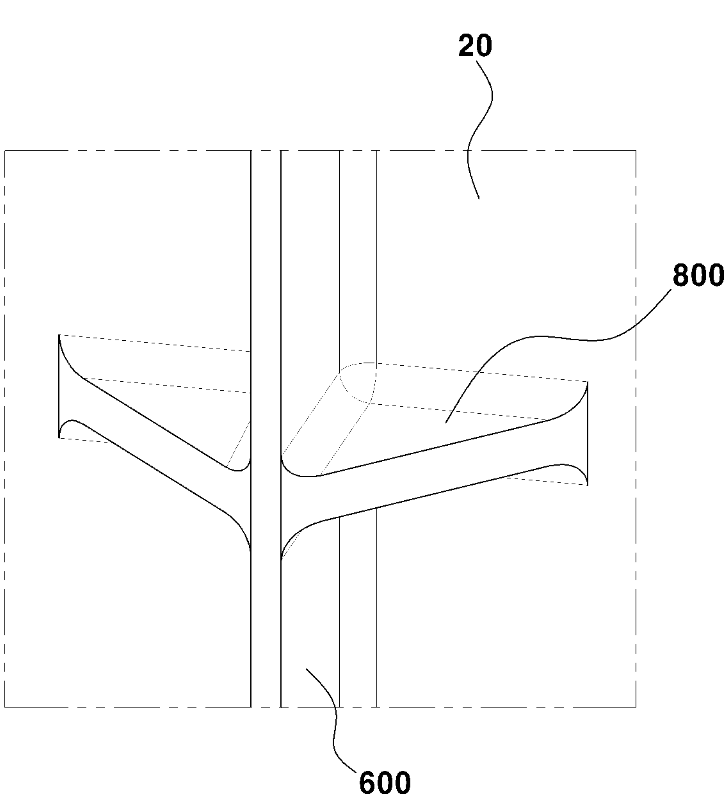

REINFORCEMENT STRUCTURE OF DECK FOR VEHICLE

CROSS-REFERENCE TO RELATED APPLICATIONS

This application claims the benefit of Korean Patent Application No. 10-2022-0179335, filed on Dec. 20, 2022, which application is hereby incorporated herein by reference.

TECHNICAL FIELD

The present disclosure relates to a reinforcement structure of a deck for a vehicle.

BACKGROUND

In general, a vehicle manufactured for the purpose of transporting people is called a passenger car, and a vehicle manufactured for the purpose of transporting goods is called a truck. These trucks may also be classified into various types.

That is, a truck with an engine positioned in front of a driver's seat is called a bonnet truck, a truck with an engine positioned under a driver's seat is called a carburetor truck, a truck with a box-type cargo compartment is called a van, a van in which a driver's seat and a cargo compartment are integrated is called a panel van, a small panel van is called a light van, and a small truck with a cargo compartment without a roof and a side plate integrated with a driver's seat is called a pickup.

Meanwhile, the pickup vehicle (cargo vehicle) as described above may be divided into a front cabin and a rear deck in which cargo is loaded and may include wheelhouse assemblies that are provided with upper surfaces of both sides of the deck and a rear surface of a cabin to improve the overall appearance of the cargo compartment.

However, in the related art, the wheelhouse assembly has a structure that is coupled to a separate structure coupled to a chassis frame and is vulnerable to impact when a rear gate is opened.

Korean patent document 20-1999-0017309 may provide information related to the background of embodiments of the present disclosure.

SUMMARY

The present disclosure relates to a reinforcement structure of a deck for a vehicle. Particular embodiments relate to a reinforcement structure of a deck for a vehicle that can be integrally formed with a wheelhouse assembly to secure sufficient rigidity when opening and closing a rear gate.

Therefore, embodiments of the present disclosure address problems in the art and provide a reinforcement unit integrally configured with a wheelhouse assembly.

In addition, embodiments of the present disclosure provide a wheelhouse assembly and a reinforcement unit that can be directly fastened to a chassis frame and provide a reinforcement structure of a deck for a vehicle that can be integrally cast.

Embodiments of the present disclosure are not limited to the above-mentioned embodiments, and other embodiments of the present disclosure that are not mentioned may be understood by the following description and will be more clearly appreciated by exemplary embodiments of the present disclosure. Also, the embodiments of the present disclosure may be realized by the means and combinations indicated in the claims.

A reinforcement structure of a deck for a vehicle according to embodiments of the present disclosure includes the following configuration.

According to an embodiment of the present disclosure, a reinforcement structure of a deck for a vehicle includes chassis frames that are positioned on both side surfaces of a lower end of the deck for the vehicle, a wheelhouse assembly that is positioned on the chassis frame and constitutes a side surface of the deck, and a reinforcement unit that is configured at an end of the assembly where a rear gate is positioned at a rear end of the deck, in which the reinforcement unit includes a gradation part in which a plurality of rigid ribs are positioned in a height direction.

The reinforcement unit may be positioned by being fastened to a side member positioned at the end of the deck.

The gradation part may include a plurality of rigid ribs having equal intervals along the height direction based on the side member.

The reinforcement unit may further include a rigid part that is formed at the end of the gradation part, a striker part that is positioned on the rigid part and fastened to a locker of the rear gate, and a hinge part that is positioned between the rear gate and the rigid part to rotatably open and close the rear gate.

The rigid rib positioned at equal intervals may be configured to have a smaller interval than an interval of a mounting hole configured so that the striker part is fastened to the reinforcement unit or a mounting hole where the hinge part is positioned.

The gradation part may include a plurality of rigid ribs having an equal angle along the height direction based on the side member.

The reinforcement structure may further include a rear hook part that is positioned adjacent to the rigid rib.

The rigid rib and one end of the rigid part may constitute a 'P'-shaped cross section.

The reinforcement structure may further include a chassis mounting part that is positioned on the wheelhouse assembly and in contact with the chassis frame and a vertical rib that extends in a height direction of the chassis mounting part of the wheelhouse assembly.

The reinforcement structure may further include a side hook part that is configured at a position corresponding to the vertical rib.

The reinforcement structure of a deck for a vehicle includes chassis frames that are positioned on both side surfaces of a lower end of the deck for the vehicle, a wheelhouse assembly that is positioned on the chassis frame and formed according to a curvature of the wheel, a side member that is positioned at an end of the deck, and a reinforcement unit that is configured at an end of the wheelhouse assembly where a rear gate is positioned at a rear end of the deck, in which the reinforcement unit includes a gradation part in which a plurality of rigid ribs are positioned at equal intervals in a height direction of the side member.

The reinforcement unit may further include a rigid part that is formed at the end of the gradation part, a striker part that is positioned on the rigid part and fastened to a locker of the rear gate, and a hinge part that is positioned between the rear gate and the rigid part to rotatably open and close the rear gate.

The rigid rib positioned at equal intervals may be configured to have a smaller interval than an interval of a mounting hole configured so that the striker part is fastened to the reinforcement unit or a mounting hole where the hinge part is positioned.

The gradation part may include a plurality of rigid ribs having an equal angle along the height direction based on the side member.

The reinforcement structure may further include a rear hook part that is positioned adjacent to the rigid rib.

The rigid rib and one end of the rigid part may constitute a 'P'-shaped cross section.

The reinforcement structure may further include a chassis mounting part that is positioned on the wheelhouse assembly and in contact with the chassis frame and a vertical rib that extends in a height direction of the chassis mounting part of the wheelhouse assembly.

The reinforcement structure may further include a side hook part that is configured at a position corresponding to the vertical rib.

The wheelhouse and the reinforcement unit may be configured to be integrally cast.

BRIEF DESCRIPTION OF THE DRAWINGS

The above and other features of embodiments of the present disclosure will now be described in detail with reference to certain exemplary examples thereof illustrated in the accompanying drawings which are given herein by way of illustration only, and thus are not limitative of the present disclosure, and wherein:

FIG. 1 is a perspective view of a deck for a vehicle according to an embodiment of the present disclosure;

FIG. 2 is a rear perspective view of the deck for a vehicle according to an embodiment of the present disclosure;

FIG. 3 is an inner side view of a reinforcement unit of the deck for a vehicle according to an embodiment of the present disclosure;

FIG. 4 is a diagram illustrating a configuration of a gradation part of the reinforcement unit of the deck for a vehicle according to an embodiment of the present disclosure;

FIG. 5 is a side view of the gradation part of the reinforcement unit of the deck for a vehicle according to an embodiment of the present disclosure;

FIG. 6 is a top view of the gradation part of the reinforcement unit of the deck for a vehicle according to an embodiment of the present disclosure;

FIG. 7 is a side view of the deck for a vehicle according to an embodiment of the present disclosure;

FIG. 8 is an enlarged view of a wheelhouse including a vertical rib according to an embodiment of the present disclosure; and FIG. 9 is a diagram illustrating a rear surface of a side hook part including the vertical rib according to an embodiment of the present disclosure.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes, will be determined in part by the particular intended application and use environment.

In the figures, reference numbers refer to the same or equivalent sections of embodiments of the present disclosure throughout the several figures of the drawings.

The following reference identifiers may be used in connection with the figures to describe exemplary embodiments of the present invention.

10: Chassis frame
20: Wheelhouse assembly
30: Side member
100: Reinforcement unit
200: Gradation part
210: Rigid rib
300: Rigid part
310: Striker part
311: Striker part mounting hole
320: Hinge part
321: Hinge part mounting hole
400: Rear hook part
500: Chassis mounting part
600: Vertical rib
700: Side hook part
800: Reinforcing rib
900: Rear gate

DETAILED DESCRIPTION OF ILLUSTRATIVE EMBODIMENTS

Hereinafter, embodiments of the present disclosure will be described in more detail with reference to the accompanying drawings. Embodiments of the present disclosure may be modified in various forms, and the scope of the present disclosure should not be construed as being limited to the following examples. The present embodiments are provided so that this disclosure will be thorough and complete and will fully convey the concept of the disclosure to those skilled in the art.

In addition, the terms " . . . er/or," " . . . unit," or the like described in the specification mean a processing unit of at least one function or operation and may be implemented by hardware or software or a combination of hardware and software.

In addition, the terms used in the present specification are used only in order to describe specific embodiments rather than for limiting the present embodiment. Singular forms are intended to include plural forms unless the context clearly indicates otherwise.

In addition, in this specification, dividing names of components into a side surface and a rear surface, etc., will be used to divide components having the same configuration from each other and will not necessarily be limited to a sequence thereof.

Hereinafter, exemplary embodiments of the present disclosure will be described in detail with reference to the accompanying drawings. In describing exemplary embodiments of the present disclosure with reference to the accompanying drawings, components that are the same as or correspond to each other will be denoted by the same reference numerals, and an overlapped description thereof will be omitted.

Embodiments of the present disclosure relate to a pickup vehicle and relate to a rigidity reinforcing structure of a wheelhouse assembly 20 constituting a side wall of a deck on which cargo is loaded and a reinforcement unit 100 formed at an end of the wheelhouse assembly 20.

FIGS. 1 and 2 illustrate a deck of the pickup vehicle.

As illustrated, the pickup vehicle is divided into a front cabin and a rear cargo deck on which cargo is loaded, in which a floor forming a rear surface of the deck is constituted on the chassis frame 10 formed at the lower end of the deck in a longitudinal direction of the vehicle. Furthermore, the pickup vehicle includes a side wall positioned on both side surfaces of the floor and fastened to the chassis frame 10. In an embodiment of the present disclosure, the side wall may include the wheelhouse assembly 20 and the reinforcement unit 100.

Moreover, the wheelhouse assembly 20 and the reinforcement unit 100 constituting the side wall may be configured as one assembly, and more preferably, the wheelhouse assembly 20 and the reinforcement unit 100 may be configured by being cast once through a mold.

In an embodiment of the present disclosure, the wheelhouse assembly 20, the reinforcement unit 100, and the gradation part 200 in which a plurality of rigid ribs 210 positioned in the reinforcement unit 100 are positioned in the height direction may be made of one or more materials selected from the group of materials consisting of aluminum, an aluminum alloy, and steel, and may be configured to be integrally cast using a low pressure permanent mold and one sand core.

A chassis mounting part 500 may be provided in an area where the chassis frame 10 and the wheelhouse assembly 20 face each other, and the chassis mounting part 500 may include at least one area that protrudes downward from the wheelhouse assembly 20 and contacts the chassis frame 10. Moreover, the chassis mounting part 500 may be bolted to the chassis frame 10 or fixed by welding. More preferably, the chassis mounting part, the reinforcement unit, and the wheelhouse assembly are integrally configured.

A vertical rib 600 may be provided along the height direction of the wheelhouse assembly 20 in which the chassis mounting part 500 is positioned, and at least one side hook part 700 positioned inside the deck in contact with the vertical rib 600 may be provided. Furthermore, the side hook part 700 may be positioned in the wheelhouse assembly 20 facing the vertical rib 600, including a reinforcing rib 800 formed in a direction perpendicular to the vertical rib 600.

The reinforcement unit 100 is configured to be formed at an open end where a rear gate 900 is positioned at the end of the wheelhouse assembly 20. Moreover, the reinforcement unit 100 includes the gradation part 200 in which a plurality of rigid ribs 210 are positioned, and the end of the gradation part 200 is provided with a rigid part 300 formed in an area facing the rear gate 900.

The rigid part 300 may be configured by extending a panel configured to surround the plurality of rigid ribs 210, and the rigid part 300 may further include a striker part 310 that is formed at a position corresponding to the locker formed on the rear gate 900 and a hinge part 320 that is positioned between the rear gate 900 and the rigid part 300 so that the rear gate 900 rotates.

Figure 3:
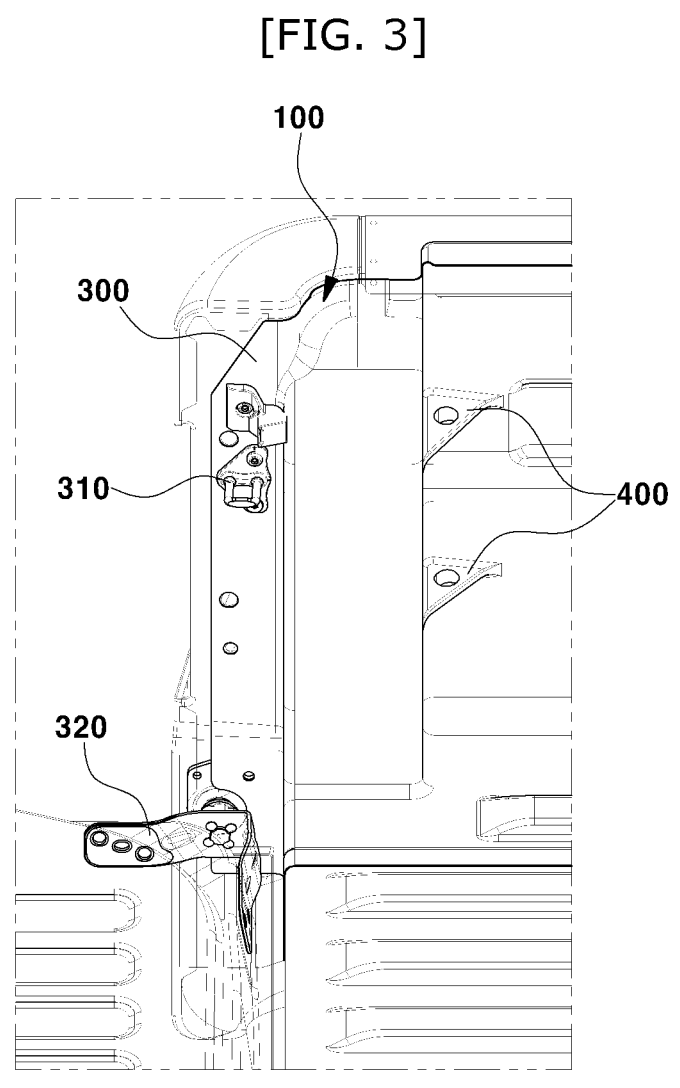

FIG. 3 is an inner side view of a reinforcement unit of the deck for a vehicle according to an embodiment of the present disclosure.

As illustrated, the inner side surface of the deck of the gradation part 200 is enlarged and illustrated, the lower end of the rigid part 300 may be fastened to the rear gate 900 through the hinge part 320, and the upper end of the rigid part 300 may be provided with a striker part 310 so that the locker positioned at the rear gate 900 may be fixed. Moreover, the hinge part 320 and the striker part 310 may include two striker part mounting holes 311 positioned in the rigid part 300. In addition, at least one rear hook part 400 may be included on the inner side surface of the gradation part 200 including the plurality of rigid ribs 210.

The rear hook part 400 may be positioned adjacent to one end of the plurality of rigid ribs 210, and more preferably, may extend and be positioned at one end of the front surface of the rigid rib 210 along the longitudinal direction of the vehicle based on the top view.

FIGS. 4 to 5 illustrate the gradation part 200 including the plurality of rigid ribs 210 and the rigid part 300, and FIG. 6 illustrates a top view of the gradation part 200 including the rigid rib 210 and the rigid part 300.

As illustrated in FIGS. 4 and 5, the gradation part 200 includes the rigid ribs 210 formed at the front end of the rigid part 300 in the longitudinal direction. The gradation part 200 is configured so that the plurality of rigid ribs 210 are configured to have equal intervals along the height direction of the vehicle. Moreover, the plurality of rigid ribs 210 may be configured to have an equal angle, and the rigid rib 210 may be configured to have an arc shape based on the rigid part 300.

That is, the rigid ribs 210 are configured to have equal intervals and an equal angle based on the rigid part 300 and are configured so that the space between the rigid ribs 210 widens as the distance from the rigid part 300 increases.

In addition, the rigid ribs 210 configured to have equal intervals is configured to have an interval smaller than the interval between the two striker part mounting holes 311 to which the striker part 310 formed on the rigid part 300 is fixed or the interval between two hinge parts 320 mounting holes 321 where the hinge parts 320 are positioned. Accordingly, as the rear gate 900 is opened and closed, a supporting force corresponding to an impact applied to the mounting holes 311 and 321 positioned in the rigid part 300 may be configured to be applied from the rigid rib 210.

Moreover, as illustrated in FIG. 4, one of the lower ends of the plurality of rigid ribs 210 may be positioned in contact with the upper end of the side member 30 constituting the deck. More preferably, the reinforcement unit 100 may be positioned by being fastened to the upper surface of the side member 30 positioned along the width direction of the vehicle at the end of the deck.

FIG. 6 illustrates a top view of the deck including the rigid rib 210 constituting the gradation part 200, the rigid part 300, and the rear hook part 400.

As illustrated, the gradation part 200 and the rigid part 300 are configured to have a ‘P’ shape in cross section, and furthermore, the upper ends of the rear hook part 400 and the rigid rib 210 in cross section are also configured to have a ‘P’ shape.

More preferably, in an embodiment of the present disclosure, the cross section of the rigid rib 210 including the rear hook part 400 forms a state in which ‘P’ rotates 90° counterclockwise, and the lower end may be provided with the rigid rib 210 and the rigid part 300 so that the rigid rib 210 and the rigid part 300 have a ‘P’ shape.

Moreover, the rigid rib 210 of the gradation part 200 on the upper cross section may be configured in a shape in which the width becomes narrower from the front to the rear of the vehicle, and the end where the rigid part 300 is positioned may have the smallest width.

In addition, in the case of the area facing the deck including the rear hook part 400, the rib formed between the end of the rigid rib 210 and the wheelhouse assembly 20 is provided. Therefore, the rigidity of the deck side surface in the longitudinal direction is secured through the rigid rib 210 and the rear hook part 400.

FIG. 7 illustrates a side surface view of the wheelhouse assembly 20 in the reinforcement structure of a deck for a vehicle according to embodiments of the present disclosure.

As illustrated, the wheelhouse assembly 20 positioned at the upper end of the chassis frame 10 is configured to be fastened to the chassis frame 10 through the chassis mounting part 500. Furthermore, a vertical rib 600 formed along the height direction of the wheelhouse assembly 20 along the height direction where the chassis mounting part 500 is positioned is provided.

The vertical rib 600 is formed on an outer side surface of the wheelhouse assembly 20 that does not face the deck and is configured to extend to the upper end from the chassis mounting part 500 in the height direction.

Moreover, as illustrated in FIGS. 8 and 9, the wheelhouse assembly 20 is configured to include a side hook part 700 on one side surface exposed to the deck. At least one side hook part 700 may be configured along the height direction where the vertical rib 600 is located and is configured so that the reinforcing rib 800 is located along the longitudinal direction of the vehicle based on the vertical rib 600.

Embodiments of the present disclosure can obtain the following effects by combining the configuration, combination, and usage relationship to be described below with the described embodiments.

Embodiments of the present disclosure have the effect of providing convenience in work by providing a reinforcement structure of a deck for a vehicle in which a wheelhouse assembly and a reinforcement unit can be integrally cast.

In addition, embodiments of the present disclosure have an effect of providing support rigidity of a wheelhouse assembly according to opening and closing of a rear gate by providing a reinforcement unit including a plurality of rigid ribs.

Embodiments of the present disclosure have been described in connection with what is presently considered to be practical exemplary embodiments. Although the exemplary embodiments of the present disclosure have been described, the present disclosure also may be used in various other combinations, modifications, and environments. In other words, embodiments of the present disclosure may be changed or modified within the range of concept of the disclosure disclosed in the specification, the range equivalent to the disclosure and/or the range of the technology or knowledge in the field to which the present disclosure pertains. The described embodiments describe the best state for implementing the technical idea of the present disclosure, and various changes required in the specific application field and use of the present disclosure are possible. Therefore, it is to be understood that the disclosure is not limited to the disclosed exemplary embodiments. It is to be understood that other exemplary embodiments are also included within the spirit and scope of the appended claims.

What is claimed is:

1. A structure for reinforcing a deck of a vehicle, the structure comprising:
- chassis frames positioned on both side surfaces of a lower end of the deck of the vehicle;
- a wheelhouse assembly positioned on the chassis frames and defining a side surface of the deck;
- a reinforcement structure positioned at an end of the wheelhouse assembly at a position where a rear gate is positioned at a rear end of the deck; and
- chassis mounting parts positioned on the wheelhouse assembly in contact with the chassis frames, wherein the chassis mounting parts, the reinforcement structure, and the wheelhouse assembly are integrally configured.

2. The structure of claim 1, wherein the reinforcement structure comprises a gradation part in which a plurality of rigid ribs are positioned in a height direction.

3. The structure of claim 2, wherein the reinforcement structure is fastened to a side member positioned at the rear end of the deck.

4. The structure of claim 3, wherein the plurality of rigid ribs are positioned at equal intervals along the height direction based on the side member.

5. The structure of claim 4, wherein the reinforcement structure further comprises:
- a rigid part provided at an end of the gradation part;
- a striker part positioned on the rigid part and fastened to a locker of the rear gate; and
- a hinge part positioned between the rear gate and the rigid part to rotatably open and close the rear gate.

6. The structure of claim 5, wherein the equal intervals between the plurality of rigid ribs are smaller than intervals of mounting holes such that the striker part is fastened to the reinforcement structure or are smaller than a mounting hole where the hinge part is positioned.

7. The structure of claim 5, further comprising a rear hook part positioned adjacent to one rigid rib of the plurality of rigid ribs.

8. The structure of claim 7, wherein the one rigid rib and one end of the rigid part have a ‘P’-shaped cross section.

9. The structure of claim 3, wherein the plurality of rigid ribs have an equal angle along the height direction based on the side member.

10. The structure of claim 1, further comprising vertical ribs extending in a height direction of the chassis mounting parts of the wheelhouse assembly.

11. The structure of claim 10, further comprising a side hook part at a position corresponding to one of the vertical ribs.

12. A structure for reinforcing a deck of a vehicle, the structure comprising:
- chassis frames positioned on both side surfaces of a lower end of the deck of the vehicle;
- a wheelhouse assembly positioned on the chassis frames and shaped according to a curvature of wheels of the vehicle;
- a side member positioned at a rear end of the deck;
- a reinforcement structure positioned at an end of the wheelhouse assembly at a position where a rear gate is positioned at the rear end of the deck;
- wherein the reinforcement structure comprises a gradation part in which a plurality of rigid ribs are positioned at equal intervals in a height direction of the side member;
- chassis mounting parts positioned on the wheelhouse assembly in contact with the chassis frames; and
- wherein the chassis mounting parts, the reinforcement structure, and the wheelhouse assembly are integrally configured.

13. The structure of claim 12, wherein the reinforcement structure further comprises:
- a rigid part provided at an end of the gradation part;
- a striker part positioned on the rigid part and fastened to a locker of the rear gate; and
- a hinge part positioned between the rear gate and the rigid part to rotatably open and close the rear gate.

14. The structure of claim 13, wherein the equal intervals of the plurality of rigid ribs are smaller than intervals of mounting holes such that the striker part is fastened to the reinforcement structure or are smaller than intervals of mounting holes where the hinge part is positioned.

15. The structure of claim 12, wherein the plurality of rigid ribs have an equal angle along the height direction based on the side member.

16. A structure for reinforcing a deck of a vehicle, the structure comprising:

chassis frames positioned on both side surfaces of a lower end of the deck of the vehicle;

a wheelhouse assembly positioned on the chassis frames and shaped according to a curvature of wheels of the vehicle;

a side member positioned at a rear end of the deck;

a reinforcement structure positioned at an end of the wheelhouse assembly at a position where a rear gate is positioned at the rear end of the deck, wherein the reinforcement structure comprises a gradation part in which a plurality of rigid ribs are positioned at equal intervals in a height direction of the side member; and a rear hook part positioned adjacent to one rigid rib of the plurality of rigid ribs.

17. The structure of claim 16, wherein:

the reinforcement structure further comprises:

a rigid part provided at an end of the gradation part;

a striker part positioned on the rigid part and fastened to a locker of the rear gate; and a hinge part positioned between the rear gate and the rigid part to rotatably open and close the rear gate; and the one rigid rib and one end of the rigid part have a 'P'-shaped cross section.

18. The structure of claim 12, further comprising vertical ribs extending in a height direction of the chassis mounting parts of the wheelhouse assembly.

19. The structure of claim 18, further comprising a side hook part at a position corresponding to one of the vertical ribs.

20. The structure of claim 12, wherein the wheelhouse assembly and the reinforcement structure are integrally cast.

* * * * *